US012698789B2

(12) United States Patent
Abdoulaye Mbodj

(10) Patent No.: US 12,698,789 B2

(45) Date of Patent: Aug. 4, 2026

(54) DEVICE TO REDUCE TURBULENT FLOW SKIN FRICTION USING CARBON DIOXIDE, RIBLETS, AND SUCTION HOLES

(71) Applicant: Papa Abdoulaye Mbodj, Denver, CO (US)

(72) Inventor: Papa Abdoulaye Mbodj, Denver, CO (US)

( * ) Notice: Subject to any disclaimer, the term of this patent is extended or adjusted under 35 U.S.C. 154(b) by 0 days.

(21) Appl. No.: 19/372,461

(22) Filed: Oct. 29, 2025

(65) Prior Publication Data

US 2026/0055785 A1 Feb. 26, 2026

Related U.S. Application Data

(63) Continuation of application No. 19/106,684, filed as application No. PCT/US2024/018773 on Mar. 7, 2024, now Pat. No. 12,492,717.

(60) Provisional application No. 63/531,164, filed on Aug. 7, 2023.

(51) Int. Cl.
*F15D 1/00* (2006.01)
*F04D 29/66* (2006.01)

(52) U.S. Cl.
CPC .......... *F15D 1/008* (2013.01); *F15D 1/0035* (2013.01); *F04D 29/667* (2013.01)

(58) Field of Classification Search
CPC ...... F04D 29/667; F15D 1/008; F15D 1/0035; B64C 21/02; B64C 21/025; B64C 21/04; B64C 21/06; B64C 21/10
See application file for complete search history.

(56) References Cited

U.S. PATENT DOCUMENTS 3,095,163 A * 6/1963 Hill ........................ F42B 15/12 422/907
5,542,630 A * 8/1996 Savill ..................... B64C 21/10 244/209
2014/0332631 A1* 11/2014 Rawlings .................. B32B 3/30 244/130
2018/0079492 A1* 3/2018 Seidel .................. B64D 15/163
2019/0389588 A1* 12/2019 Zha ........................ B64D 15/04

* cited by examiner

*Primary Examiner* — Tye William Abell

(57) ABSTRACT

A device to reduce turbulent flow skin friction uses carbon dioxide, riblets, and suction holes to reduce the overall drag of a body moving in a fluid. A deflector (2) pushes up the boundary layer of the incoming flow on a surface (1). Carbon dioxide is injected into a plenum (3) and ejected through an exhaust slot (4). Riblets of specific dimensions (5) are placed to interact with the carbon dioxide flow that is now the sublayer viscous flow. After passing the riblets, the flow is sucked partly through suction holes (6), preventing flow separation that could increase the form and wave drag.

8 Claims, 6 Drawing Sheets

DEVICE TO REDUCE TURBULENT FLOW SKIN FRICTION USING CARBON DIOXIDE, RIBLETS, AND SUCTION HOLES

BACKGROUND OF THE INVENTION

A boundary layer surrounds a body in motion in a fluid. The viscous forces present at the body's surface are at the boundary layer's origin. The amount of form and skin friction drags are determined by the behavior of the boundary layer. The skin friction drag increases from a laminar to a turbulent boundary layer.

Maintaining a laminar flow on a surface can be a complex and expensive task. High accuracy is required on a moving body surface because gaps, minor disturbances, or surface deformation would disturb the laminar flow. Manufacturing such a surface is costly. Furthermore, any external factor like rain or dirt would negate any gain in real life. Thus, turbulent flow is the dominant flow in real life.

However, turbulent flow has a high friction coefficient. Even though that friction coefficient tends to decrease with a higher Reynolds number, the reduction is too small. A turbulent flow can be divided into two regions. There is a highly viscous region close to the body surface and a turbulent region further out on top of the viscous region. To mainly impact the friction coefficient of a turbulent, the viscous region interaction with the body surface must be controlled, and the growth of the turbulent region must be limited. Completed, these two tasks would significantly reduce the drag on the body moving in a fluid as skin friction drag can represent 50% of the total drag at transonic speed.

BRIEF SUMMARY OF THE INVENTION

The present invention generally provides a device to reduce form and skin friction drags on any body. Carbon dioxide has a peculiar manner of interacting with riblets with specific dimensions. The skin friction resulting from that interaction is low. Also, the growth of the turbulent region in a turbulent flow is correlated to the thickness of the viscous sublayer. The thicker the viscous sublayer is, the lower the turbulent region's growth. The viscous sublayer behaves like a damper. The suction power required to keep a turbulent boundary layer attached is significantly lowered with a smaller turbulent region.

The present invention substitutes the flow viscous sublayer with a carbon dioxide sublayer which interacts with riblets of specific dimensions to lower the friction coefficient and limit the growth of the turbulent boundary layer. Passing the riblets, the flow is actively controlled by sucking part of the flow to prevent separation. Carbon dioxide is readily available from the exhaust gases of the moving body thermal powerplant.

STATE OF PRIOR ART

Attempts have been made to reduce turbulent skin friction by injecting foreign substances. These substances are long-chain molecules, surface-active agents, microbubbles in liquid flows, solid particles, and fibers in gases or liquids.

The present invention differs from all these previous techniques because pure carbon dioxide is used with riblets having specific dimensions. These previous approaches would have led to the erosion of the riblets. Furthermore, they required the manufacturing and storage of molecules or particles, thus increasing the weight to be transported and the operating cost. The present invention uses carbon dioxide from the exhaust of the powerplant of the moving object that won't erode the riblets. Also, it takes advantage of the peculiar interaction between the carbon dioxide viscous sublayer and the riblets with specific dimensions.

U.S. Pat. No. 8,220,754 B2 disclosed a device generating plasma between riblets and plasma flow, creating virtual riblets on the surface of a moving object to reduce the drag on the object.

The present invention differs from U.S. Pat. No. 8,220,754 B2 because no plasma or virtual riblet is generated.

BRIEF DESCRIPTION OF THE SEVERAL VIEWS OF THE DRAWINGS

Having described the invention in general terms, reference will be made to the accompanying drawings, which are not necessarily drawn to scale, and wherein.

DETAILED DESCRIPTION OF THE INVENTION

Figure 1:
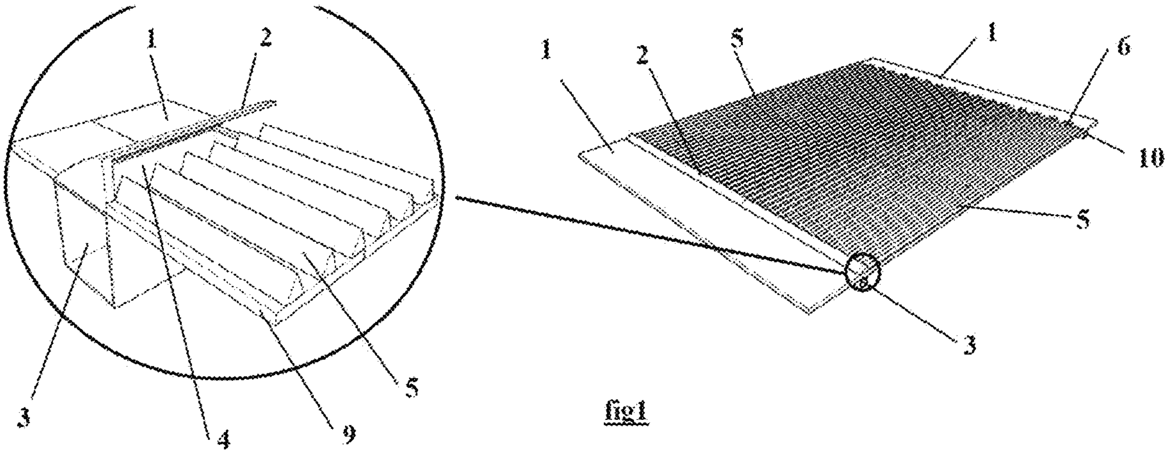
FIG. 1 shows a perspective and enlarged view of a surface with the device placed on it.
Figure 2:
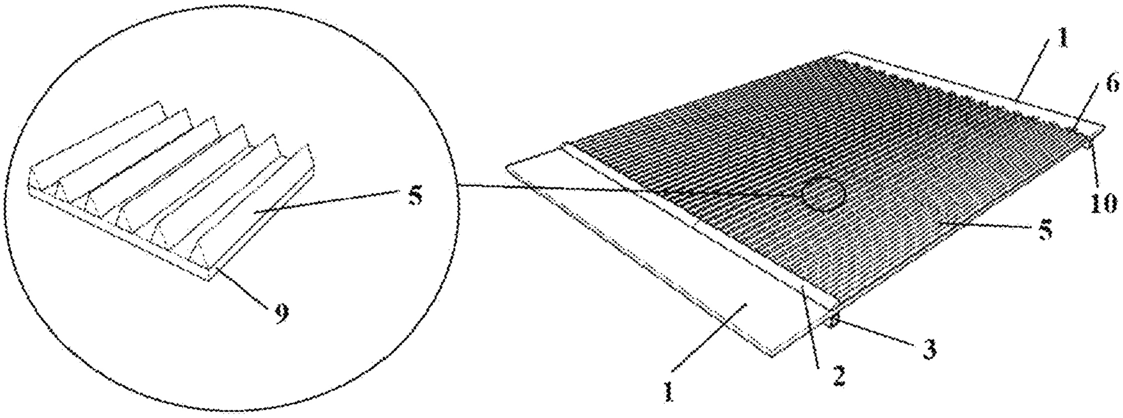
FIG. 2 shows a perspective and enlarged view of the riblets.
Figure 3:
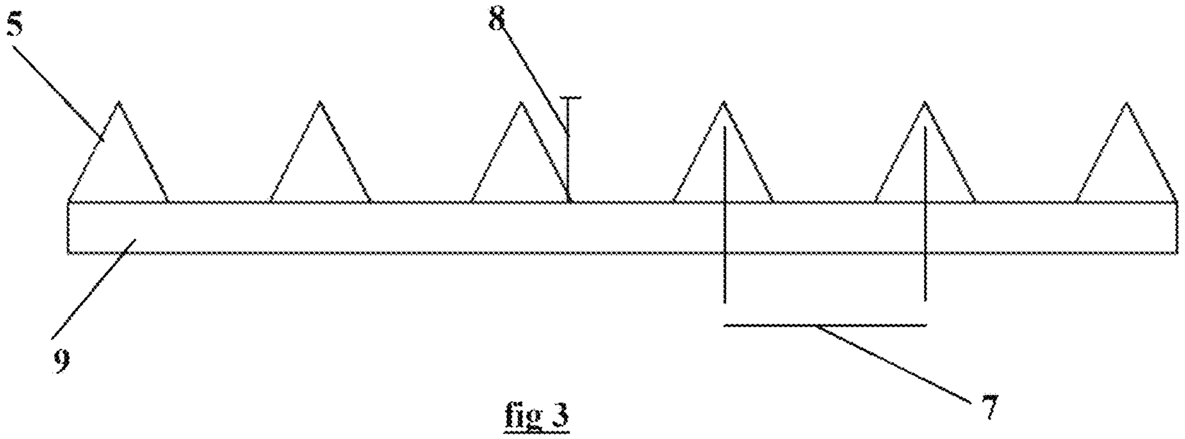
FIG. 3 shows a frontal view of the riblet film.
Figure 4:
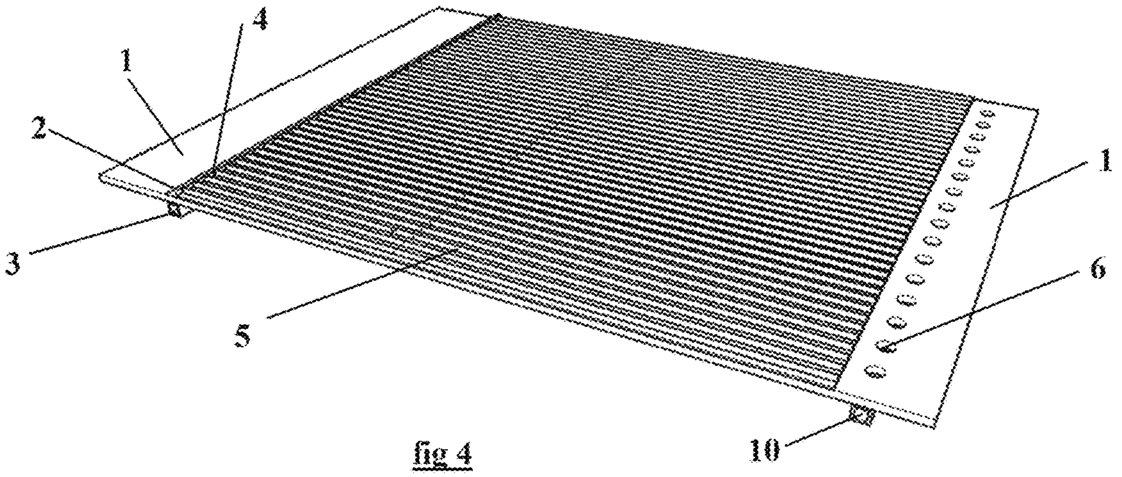
FIG. 4 shows a perspective of a surface with the device placed on it and the different plena.
Figure 5:
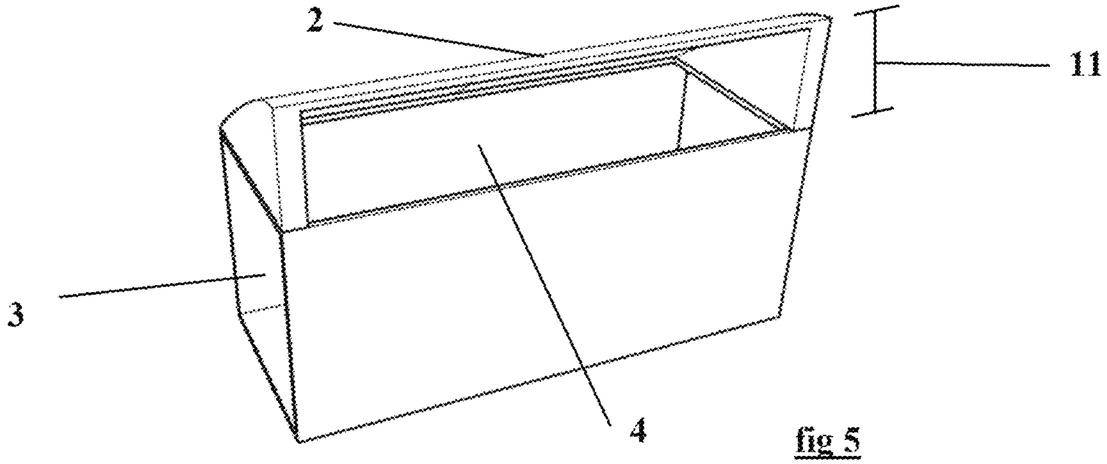
FIG. 5 shows a perspective view of the carbon dioxide plenum and the exhaust slot.
Figure 6:
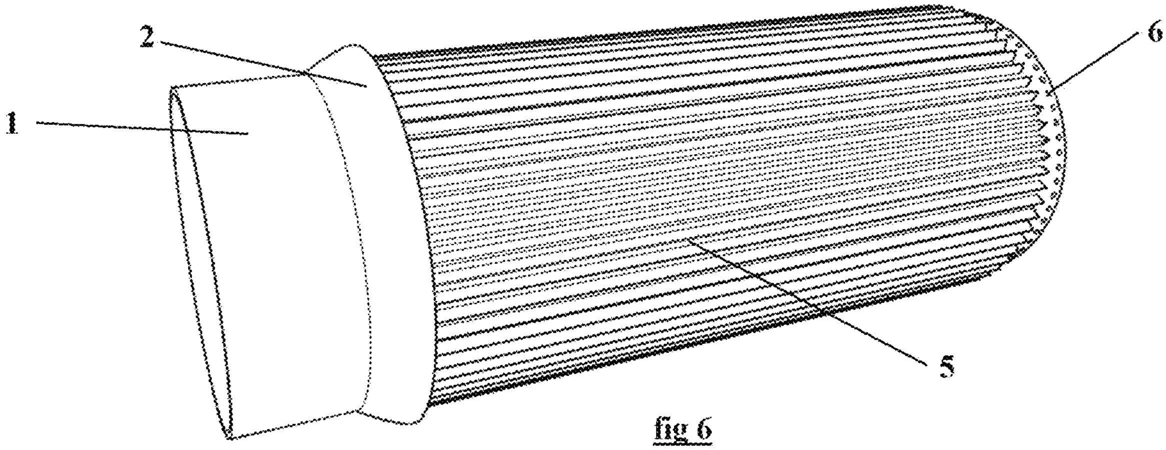
FIG. 6 shows a perspective view of a curved surface with the device placed on it.
Figure 7:
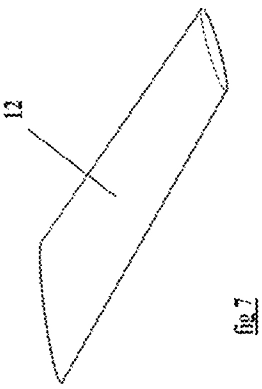
FIG. 7 shows a perspective view of a wing surface.
Figure 8:
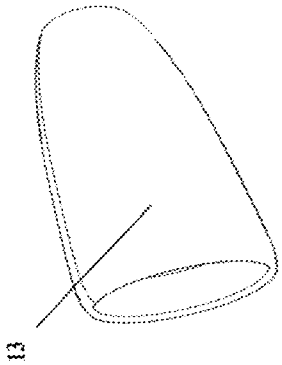
FIG. 8 shows a perspective view of an engine nacelle surface.
Figure 9:
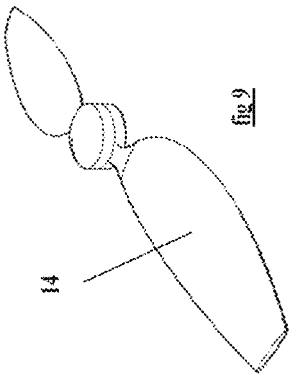
FIG. 9 shows a perspective view of a rotor blade surface.
Figure 10:
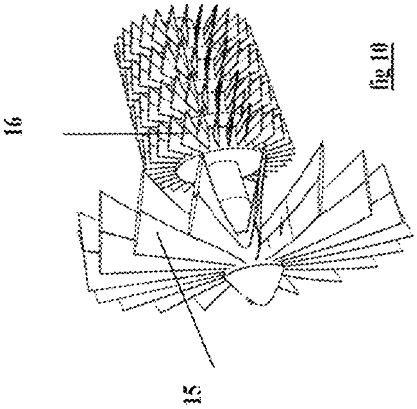
FIG. 10 shows a perspective view of a fan blade surface and axial compressor blade surface.
Figure 11:
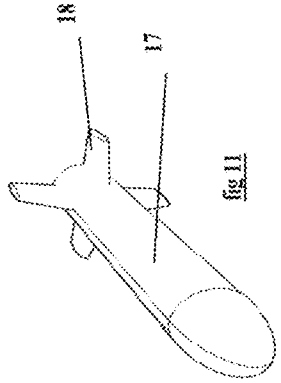
FIG. 11 shows a perspective view of a rocket surface with its stabilizers.
Figure 13:
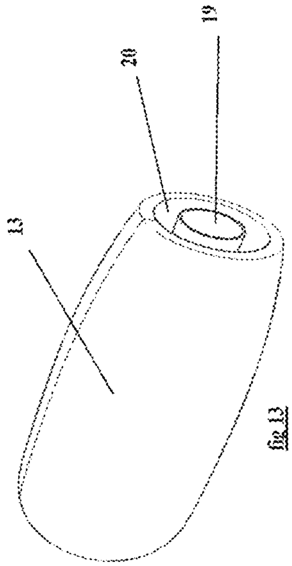
FIG. 13 shows a perspective view of a turbofan engine exhaust stream.
Figure 16:
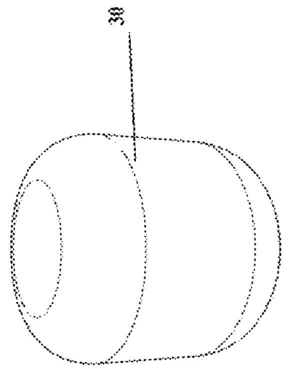
FIG. 16 shows a perspective view of a storage tank.
Figure 15:
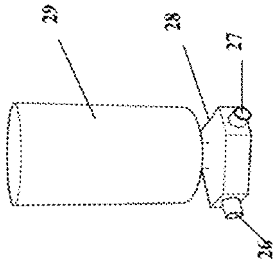
FIG. 15 shows a perspective view of a pump with a motor.
Figure 12:
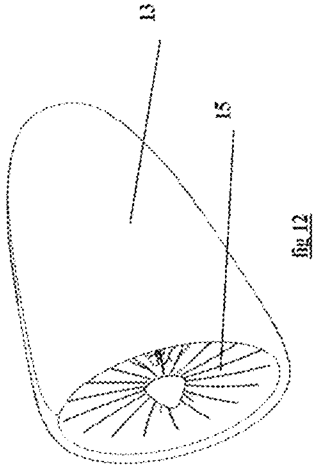
FIG. 12 shows a perspective view of a turbofan engine.
Figure 14:
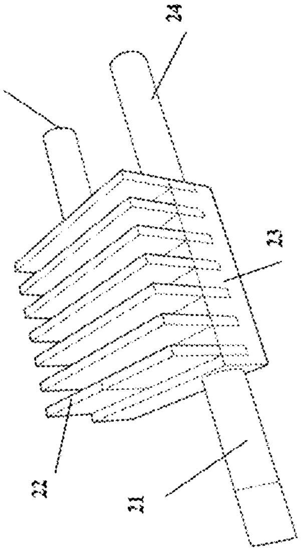
FIG. 14 shows a perspective view of a heat exchanger with a phase separator.
Figure 17:
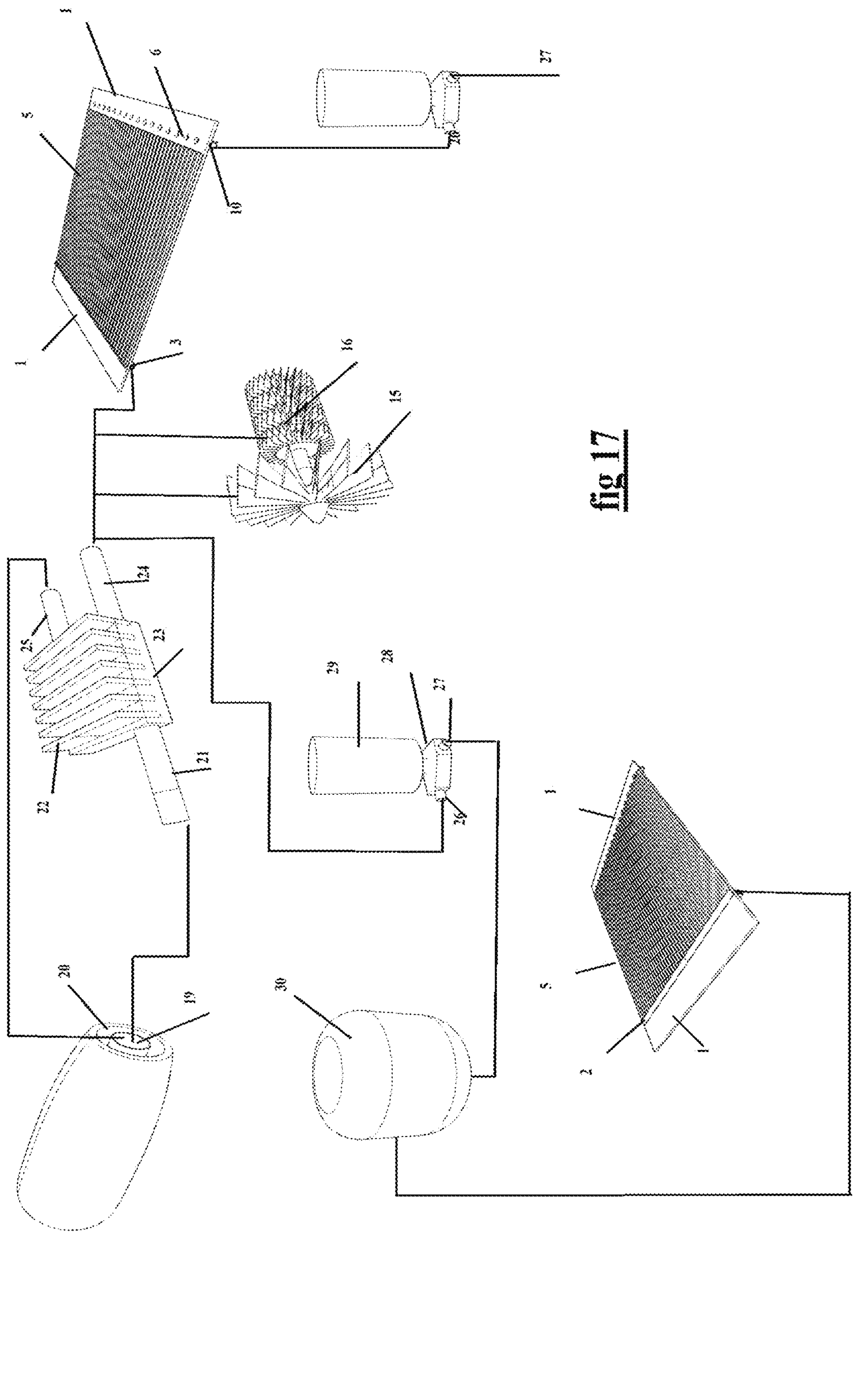
FIG. 17 shows a diagram of the different elements interacting with the device.

The present invention will be described more exhaustively hereinafter with reference to the accompanying drawings, in which some, but not all the embodiments of the invention are shown. Indeed, the invention may be embodied in many different forms and should not be construed as limited to the embodiments set forth herein; rather, the embodiments are provided so that the disclosure will satisfy applicable legal requirements. Like numbers refer to like elements throughout.

A body surface in relative motion in a fluid would experience the formation of a boundary layer. Initially, the boundary layer is laminar before becoming turbulent. On surface 1, a flow deflector 2 is placed, pushing up the entire boundary layer of the relative flow. That deflector 2 is placed in front of the Riblets 5. Carbon dioxide is injected in the plenum 3 below the surface and ejected through the exhaust slot 4 toward the riblets 5. The riblets are wall grooves aligned with the freestream. The riblets 5 are placed on a thin film 9 with adhesive fixing them on the surface 1. The riblets are manufactured using plastics and are coated with anions to attract carbon dioxide. The width 7 between two riblets varies from 70 to 200 micrometers (one micrometer equals 0.000001 meters). The height 8 of a riblet varies from 40 to 100 micrometers. These dimensions must be maintained to take advantage of the peculiar interaction between carbon dioxide and riblets, significantly reducing skin friction drag. Thus, the exhaust slot 4 and the flow deflector 2 must be limited to a maximum height 11 of 120 micrometers. That peculiar interaction is based on density and pressure wave propagation or speed of sound. At the end of the riblets 5 and riblet film 9, suction holes 6 are placed and connected to a plenum 10 through which part of the flow is sucked to prevent flow separation. The Plenum 10 is connected to the inlet 26 of a pump 28 driven by a motor 29. The device, as described, can be placed on the surface of a wing 12. Thus, the wing sweep angle can be significantly reduced for a transonic airplane. The aircraft's performance will significantly improve. Also, the device can be placed on the surface of engine nacelle 13, rotor blade 14, or rocket 17 to reduce skin friction significantly. The present device would greatly improve controllability when placed on the stabilizers or control surfaces 18. Furthermore, the device can be placed on a fan blade surface 15 and axial compressor blade surface 16 to improve propulsive efficiency and pressure ratio. For a fan blade and compressor stage, the adverse pressure gradient on the surface leads to reduced efficiency. The present invention would diminish the losses.

The carbon dioxide, in certain situations like for a rocket, is supplied to the plenum 3 using a storage tank 30. In the case of a jet engine, carbon dioxide is extracted from the hot exhaust gases coming from the primary core 19. The extraction process uses the low temperature of the secondary core exhaust 20 and ambient air at high altitudes. A heat exchanger with fins 22 and phase separator 23 is used for that. Obtaining pure carbon dioxide on the ground out of exhaust gases would require voluminous and expensive infrastructures. Quenchers, absorber columns, stripping columns, chemical products like amines, and fans would be necessary to obtain carbon dioxide, which will still have impurities. However, at high altitudes, the low temperature already presents simplify the process. By referring to the standard atmosphere model, above 20 000 feet, the outside air temperature is less than −20 degrees Celsius. At such temperature, all the nitrogen oxides, sulfur oxides, water, and other gases would be liquified or solidified except for the carbon dioxide that would remain in the gaseous phase.

Thus, the exhaust gases from the primary core of a turbofan 19 are sent to the inlet of a heat exchanger 21. The fins of the heat exchanger 22 are in contact with the exhaust secondary core airflow and the ambient air lowering the temperature of the gases in the heat exchanger. All gases except carbon dioxide would be liquified or solidified in phase separator 23 at high altitude. The carbon dioxide gas would go through one outlet 24 as it is less dense, while the mix of liquids and solids would go through the other outlet 25 and are reinjected into the exhausts 19 and 20. Part of the carbon dioxide from outlet 24 is sent into the plenum 3 and ejected into the riblets 5 through the exhaust slot 4. In the case of a turbofan or turbojet, the present invention is placed on the fan blades on compressor blade surfaces 15 and 16. The same approach is valid for the compressor stages of a gas turbine generating electricity on the ground. It could make carbon capture systems on the ground more attractive and viable even though they are more complex and expensive.

Another part of the carbon dioxide is stored in a tank 30. While an aircraft is descending, the engines are idle; thus, there is an excess of carbon dioxide. After leaving the heat exchanger outlet 24, that excess carbon dioxide goes through the inlet 26, where it is pressurized and becomes liquid while going through the outlet 27. The motor 29 drives the pump 28, sending the carbon dioxide into the tank 30. The carbon dioxide can boost the engines and lower the drag at the next take-off phase. Instead of having a hybrid system with a heavy electrical motor and battery, this approach would use the existing system on the engines and the present invention to boost the airplane's performance at different phases of flight where excess power is needed, or the external temperature is below −20 degrees Celsius.

As aviation will be hard to decarbonize due to the high power and energy requirements, the present device is providing a net reduction in fuel consumption and carbon dioxide emissions because efficiency is increased for the engines and skin friction drag is significantly reduced. A lower quantity of sustainable aviation fuel would be needed to complete a flight. Also, much smaller rockets are required to launch a given satellite into space.

The invention claimed is:

1. An apparatus that is a device to reduce turbulent flow skin friction using carbon dioxide, riblets, and suction holes, the apparatus comprising:
   - a surface onto which a flow deflector is attached, wherein the flow deflector is placed in front of the riblets;
   - a plenum located under the surface into which the carbon dioxide is configured to be introduced and connected to an exhaust slot;
   - the riblets coated with anions that are configured to attract the carbon dioxide and mounted on a thin film with adhesive fixing them on the surface, and with grooves facing a freestream, and placed in front of the exhaust slot;
   - suction holes are connected to a plenum located under surface; the carbon dioxide is configured to be ejected into the grooves of the riblets and the freestream is deflected on a top of the flow deflector.

2. The device to reduce turbulent flow skin friction using carbon dioxide, riblets, and suction holes according to claim 1, wherein the device is configured to be placed on the surface of a fan blade, a rotor blade, an engine nacelle, a rocket surface, a stabilizer surface, an axial compressor blade surface of a gas turbine or a wing surface.

3. The device to reduce turbulent flow skin friction using carbon dioxide, riblets, and suction holes according to claim 1, wherein the carbon dioxide is configured to be stored in a tank for being sent into the plenum and for being ejected through the exhaust slot.

4. The device to reduce turbulent flow skin friction using carbon dioxide, riblets, and suction holes according to claim 1, wherein carbon dioxide is configured to be captured from an exhaust of a primary core of a jet engine by cooling exhaust gases via a heat exchanger with a phase separator where any remaining carbon dioxide is configured to be liquified by being compressed in a pump and stored in a tank.

5. The device to reduce turbulent flow skin friction using carbon dioxide, riblets, and suction holes according to claim 1, wherein the plenum external wall is also the flow deflector.

6. The device to reduce turbulent flow skin friction using carbon dioxide, riblets, and suction holes according to claim 1, wherein the plenum, flow deflector, and riblets are all integrated into a flexible material as plastic and can be directly applied on a surface.

7. The device to reduce turbulent flow skin friction using carbon dioxide, riblets, and suction holes according to claim 1, wherein the riblets are directly printed on a surface.

8. The device to reduce turbulent flow skin friction using carbon dioxide, riblets, and suction holes according to claim 1, wherein the $CO_2$ fluid is substituted with another fluid.

* * * * *